(12) United States Patent
Cholin

(10) Patent No.: US 6,239,446 B1
(45) Date of Patent: May 29, 2001

(54) FLUID FLOW DETECTOR

(76) Inventor: John M. Cholin, 101 Roosevelt Dr., Oakland, NJ (US) 07436-2008

( * ) Notice: Subject to any disclaimer, the term of this patent is extended or adjusted under 35 U.S.C. 154(b) by 0 days.

(21) Appl. No.: 09/256,016

(22) Filed: Feb. 23, 1999

(51) Int. Cl.$^7$ ........................................ G01F 1/28
(52) U.S. Cl. ........................................ 250/577; 73/861.71
(58) Field of Search ................................. 250/577, 231.19; 73/861.71, 861.75

(56) References Cited

U.S. PATENT DOCUMENTS 5,932,814 * 8/1999 Hutchinson ........................ 73/861.75

FOREIGN PATENT DOCUMENTS

4425434 A1 * 3/1995 (DE) .

* cited by examiner

Primary Examiner—Stephone B. Allen
(74) Attorney, Agent, or Firm—W. Patrick Quast, Esq.

(57) ABSTRACT

The indication that water is flowing in a fire protection sprinkler riser is often used as an initial indication that a fire has occurred in the protected building. The subject invention is an improved water flow switch, that uses a paddle with a reflective surface placed opposite an LED/Photodiode pair. When water begins to flow the force of the water against the paddle causes the paddle to rotate about a pivot. The pair are used to optically detect the rotation of the paddle. This approach eliminates many of the maintenance problems with the electro-mechanical flow switches currently available, as well as reducing the cost of manufacture. Furthermore, it makes possible the measurement of the rate of flow in the fire suppression sprinkler system, allowing the responding fire service to determine whether the fire is being controlled by the sprinkler system or not by observing the data at the fire alarm control panel, before fire fighters enter the fire compartment.

37 Claims, 6 Drawing Sheets

FLUID FLOW DETECTOR

FIELD OF THE INVENTION

The present invention relates to flow sensors and more particularly to electronic sensors useful in monitoring water flow in fire prevention systems such as sprinklers.

BACKGROUND OF THE INVENTION

Water flow switches for sprinkler operation indication have been available for decades. Over the years a single design has evolved which consists of a switch body, a snap-action switch, a plunger which extends into the sprinkler riser and a paddle assembly which is connected to the switch body via a pivot. The paddle partially obstructs the cross-section of the pipe. When water begins to flow the paddle swings down-stream, rotating about the pivot. A cam on the paddle depresses (or releases, depending upon the design) the plunger which transmits the motive force of the paddle into the switch interior. The movement of the plunger actuates, either immediately or through a mechanical time delay called a "retard", the snap-action electro-mechanical switch, providing an electrical signal to the fire alarm control panel.

There have been a number of persistent problems with this design. The plunger must be sealed with either rubber boots or o-ring seals to prevent the leakage of water from the sprinkler pipe interior into the switch interior. This need for a sealing force results in the need for relatively large mechanical forces on the paddle. However, large required forces on the paddle result in the need for commensurately large hydraulic forces due to water flow. These large forces necessitate large water flows before the reliable actuation of the switch can be achieved. In addition, the occasional oscillation of water within the sprinkler system due to pressure fluctuation in the public utility water mains necessitates a "retard" feature. This requires the introduction of a time delay between the operation of the sensing paddle and the actuation of the electro-mechanical switch. The current state of the art relies on mechanical time delays to implement the "retard" feature. This adds to the complexity and cost of the flow switch as well as reducing its inherent reliability.

It is also desirable to provide a capability to measure a particular flow rate of the fluid in the conduit. The use of inherently reliable solid state circuitry to accomplish this is a further contribution of this invention.

In 1996 this inventor developed an Electro-Optical Valve Status Supervision Switch. U.S. Pat. No. 5,584,319 was issued on Dec. 17, 1996 for this invention. This invention utilized a reflective pit on the stem of an outside screw and yoke valve situated opposite an LED/phototransistor pair to monitor when the valve was not fully open. This development is helpful in implementing the objectives of this invention.

It is therefore a primary object of this invention to provide a fluid flow detection device having a passive interface between the signal sensing portion and the signal generation portion and the flow responsive element wherein the signal generation and sensing portions employ reliable, solid state electronic circuitry.

It is a further object of this invention that the detection device include reliable electronic circuitry to distinguish between fluid flows that are of sufficient amount and are continuous for at least a certain minimum amount of time.

It is still a further object of this invention is to employ the fluid flow detection device of this invention to detect water flows in fire protection sprinkler systems.

It is yet another object of this invention to employ certain elements of a flow responsive element presently used in the art, but which is adapted to accommodate the signal generation and sensing functions of the present invention.

A still further object of this invention is to provide a fluid flow detection device which can sense and indicate specific fluid flow rates.

SUMMARY OF THE INVENTION

Towards accomplishment of these and other objects which shall become apparent from consideration of the accompanying drawings and this detailed accompanying description, there is disclosed a fluid flow detection device for detecting the flow of fluid in a conduit such as water in a piping system supplying fire suppression sprinklers. The device disclosed includes a sensing element including a portion having a reflective surface that is situated in the fluid whose flow is to be sensed. The sensing element is positioned in the conduit utilizing a mounting element which permits the sensing element to rotationally move. The sensing element in response to the flow of fluid moves from a steady or quiescent position to a second displaced position. Of course, the reflective surface also moves. An optical illuminator such as an LED is electrically energized to produce an incident optical signal. The illuminator is fixed in position relative to the sensing element and the reflective surface, so that the optical signal from the illuminator passes through a portion of the fluid whose flow is to be detected, such that a reflected optical signal depends on the position of the sensing element, and the reflective surface, in relation to the incident optical signal. The characteristics of the reflected signal can vary depending on the characteristics of the reflective surface.

When in position where the incident optical signal is reflected, the resulting reflected optical signal is received by a optical responsive receptor. The responsive receptor includes an input portion such as a photo cell which recreates an electrical signal at the output of the receptor which is then processed. In one embodiment, the electrical signal at the receptor output includes a first and second condition, i.e. a first condition indicative of presence of the reflected optical signal; and a second condition indicative of the absence of the reflected optical signal so as to distinguish the movement of the sensing element from a first position to a second position in response to fluid flow irrespective of flow rate. An indicator which in the preferred embodiment is an electronic circuit processes the receptor output signal and produces an appropriate indicator signal to indicate the presence or absence of the reflected optical signal and thus the position of the sensing element of either one of two conditions to thereby signify the flow of fluid.

The preferred embodiment describes electronic circuitry including an oscillator which produces an oscillator output signal to energize the optical illuminator such as the LED. The oscillator output signal of the preferred embodiment includes a signal predetermined pulse width and period, and of known phase. As such the incident optical signal from the output of the LED tracks the oscillator output signal as to phase, pulse width and pulse period as does the reflected optical signal. In the preferred embodiment, the optically responsive receptor is a photo cell. Further in the preferred embodiment, a phase comparator circuit is use to produce a phase comparator output signal in response to the comparative sampling of the oscillator output signal and the responsive receptor output signal. The comparison of the two inputs produces a comparative output signal only when the receptor output signal is in phase with the oscillator output signal to thus avoid an indicator signal in response to spurious signals.

Further, a timing circuit is described which is adapted to respond to the presence to the receptor output signal to produce a change in the indicator signal indicative of the change in the receptor output signal from the first condition to a second condition after a predetermined minimum period of time. This circuit exists to obviate responses to sensing element movements due to flows that result from pressure changes, etc. in the conduits, or circumstances other than an opened sprinkler head.

The fluid flow detection device of the present invention also includes an adaptation wherein the actual flow rates of the fluid in the conduit can be approximated. This facilitates the tracking of the progress of a fire as represented by increased water flow in additional sprinkler pipes.

DESCRIPTION OF THE PREFERRED EMBODIMENT

Figure 1:
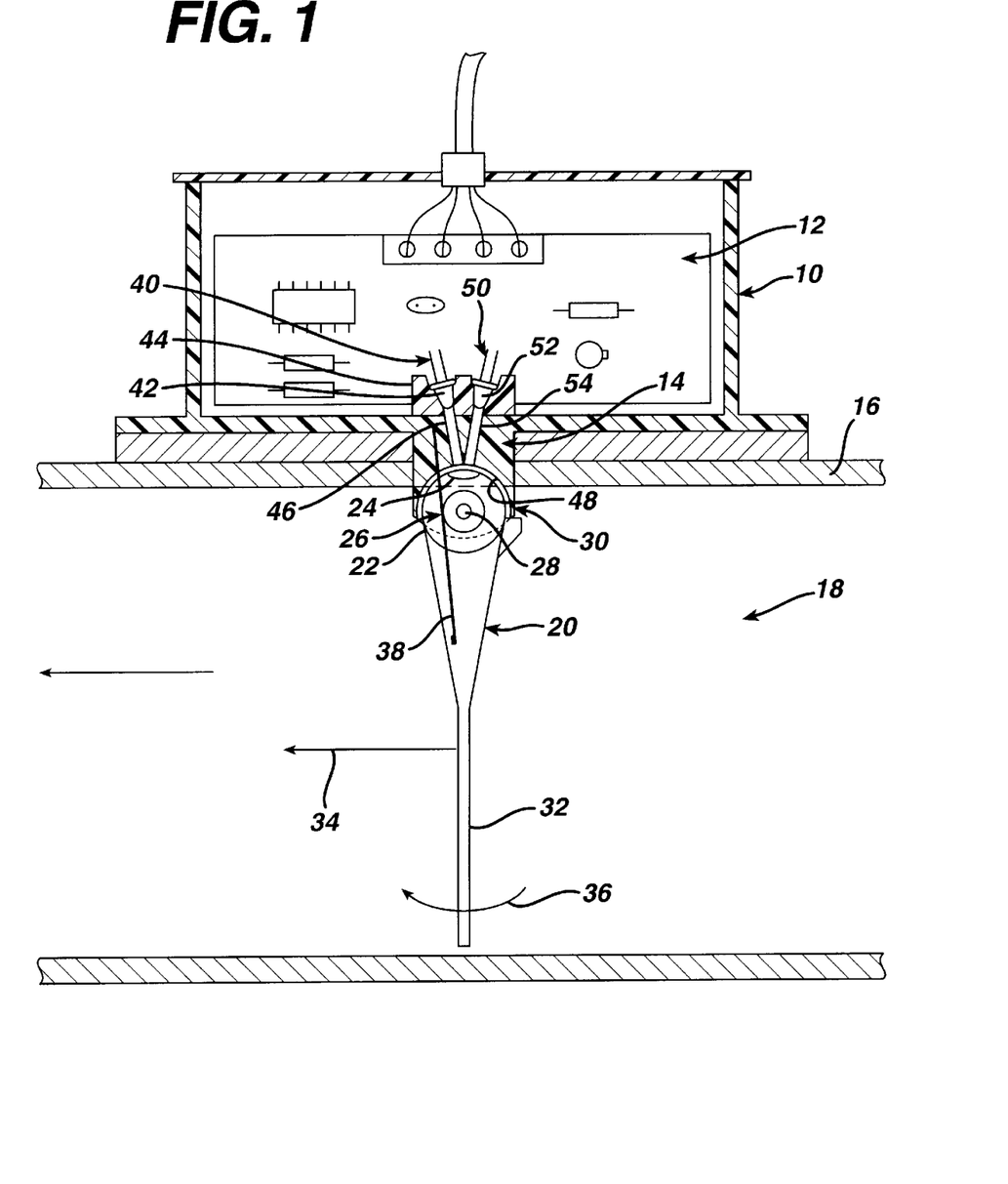
FIG. 1 is an elevation view, partially in section, of the principal elements of the preferred embodiment.

A portion of the fluid flow detection device of the present invention applied in a sprinkler system is shown in FIG. 1. It includes a housing 10, molded of an opaque, engineering plastic resin compound. It contains a circuit board 12. The housing 10 is equipped with an extension 14 that extends through the wall 16 of a riser pipe 18 typically used in a sprinkler system.

The fluid flow detection device of the invention further includes a sensing element 20. This includes an annular, circumferential portion 22 having a reflective surface 24 disposed about a part of the perimeter surface. Centrally disposed in the hub portion of the sensing element is a mounting element or portion 26 including an opening for positioning a pivot pin 28. The pin 28 is disposed through the opening and is secured in the part of extension 14 disposed behind the hub portion of the sensing element. A semi-cylindrical cavity 30 is formed in the extension 14 to accommodate the cylindrical shape of the circumferential portion 22.

The sensing element further includes a paddle member 32 which extends radially outward from the hub portion. As depicted in FIG. 1, the paddle member 32 is positioned in the water in the riser pipe in a quiescent position, i.e. the position it assumes when there is no water flow. The paddle member 10 is also molded from an optically absorptive, flat-black, resin.

Figure 3A:
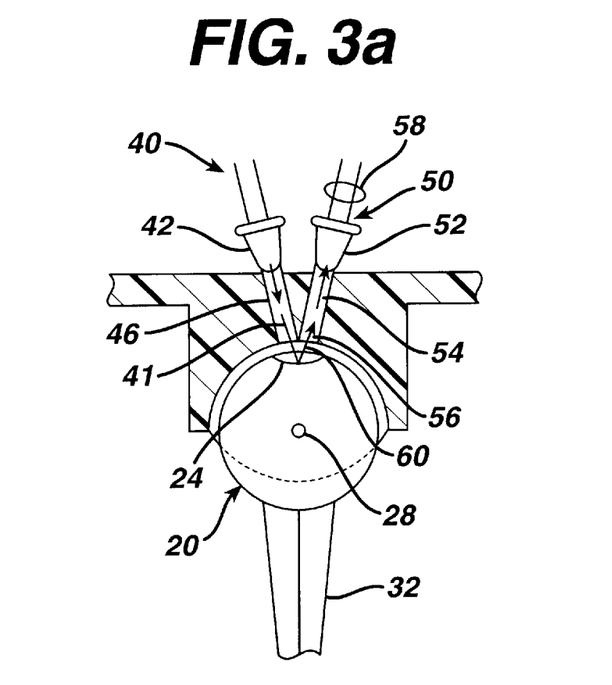
FIG. 3 is an elevation, partially sectional view, of the relationship between the illuminator and receptor in relationship to the reflected surface in a first position of the sensing element.
Figure 3B:
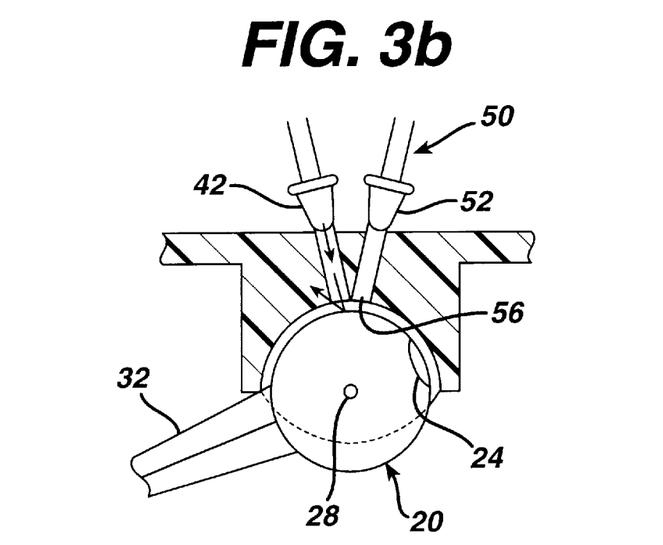
FIG. 3B depicts the relationship of the illuminator and receptor in relation to the sensing element for a second position of the latter.
Figure 4:
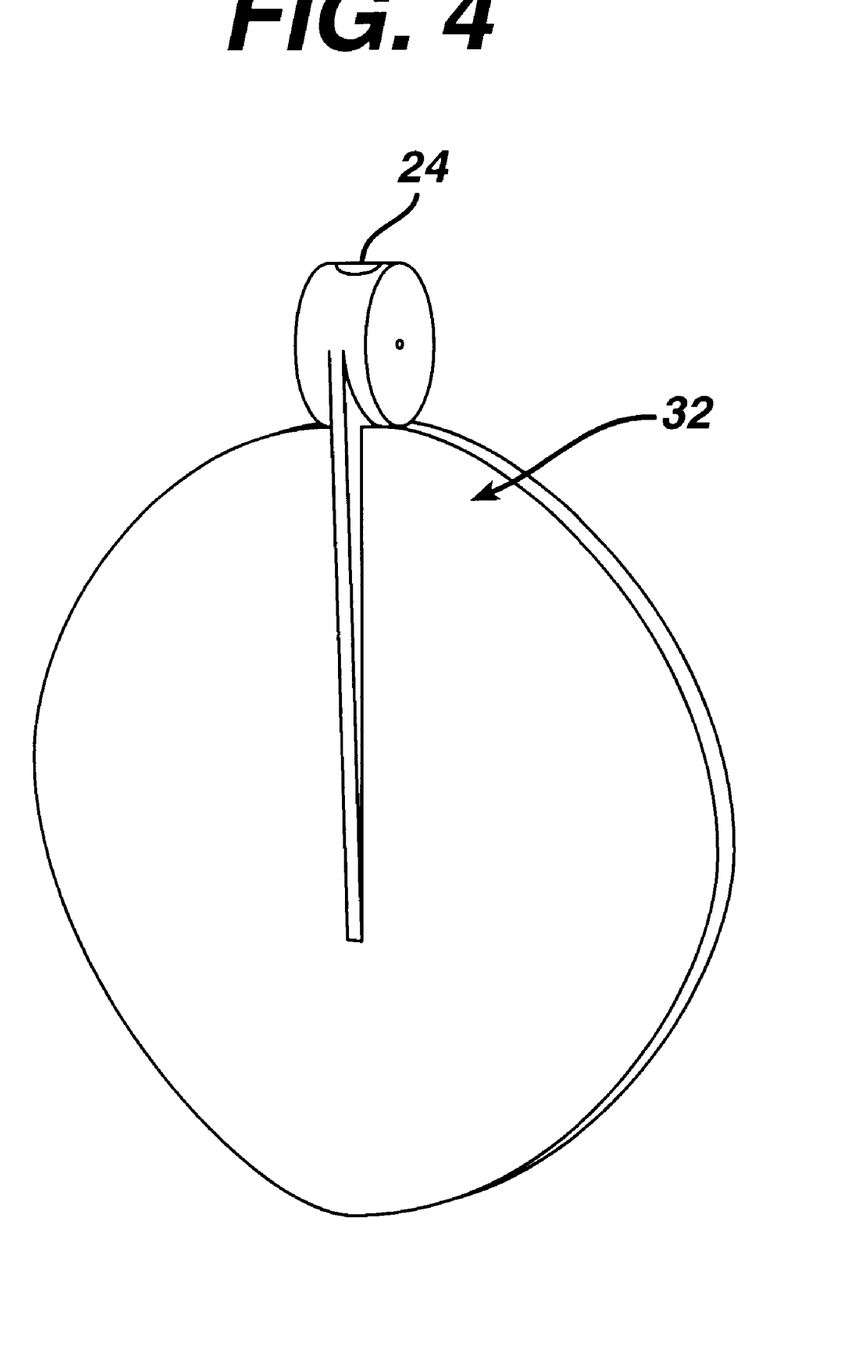
FIG. 4 shows a perspective view of the elements of the sensing element employed in the preferred embodiment of FIG. 1.

When water does flow in the riser pipe 18, in the direction 34, the paddle member responsive to the force exerting on it by the movement of the water is caused to rotate in the angular direction 36 about pivot pin 28 and assumes a displaced or flow position (see FIG. 3b). The amount of angular movement depends on the rate of flow of the fluid in response to the associated force exerted on the paddle surface. A return spring 38 suitably attached between the extension 14 and the sensing element 20 operates upon the sensing element to return the paddle member to the quiescent position when the flow of water in the pipe ceases.

The housing 10 as noted above contains a circuit board 12 on which various electrical components used in the associated circuitry are employed. Components on the board to be discussed hereinafter are connected to an optical illuminator 40. The optical illuminator, fixed in place, produces an incident optical signal 41 (see FIG. 3a) when energized which will have a wave length between the infrared and ultraviolet regions as the application dictates. The most cost effective and efficient LEDs are the gallium arsenide devices that operate in the 0.9 micron region of the infrared spectrum. The most cost effective and efficient photodiodes and phototransistors are the silicon devices that operate in the 0.9 micron portion of the infrared spectrum. Consequently, as long as the medium being monitored and the plastic used for the device housing are transmittant at this wavelength there is no compelling reason to select some other wavelength. However, some oils are absorbent at 0.9 microns and, consequently, either visible or 1.5 micron LEDs and photodiodes might be more appropriate. The critical criteria to consider are the transmittance of different monitored media if necessary.

In the preferred embodiment, the optical illuminator includes an LED 42 positioned in an opaque holder 44 at the entrance of a light pipe 46. The light pipe is made from an optically transparent (at the wave length of interest) solid plastic resin which is posited in an accommodating channel in the opaque extension 14. The light pipe extends from the LED and breaks through the arcuate segment 48 of the extension 14 to thereby permit the optical signal to pass through the fluid whose flow is to be detected or measured and provide the incident optical signal at the surface of the circumferential portion 22.

An optically responsive receptor 50 is also positioned in the opaque holder 44. In the preferred embodiment it includes a photocell 52 positioned at the exit of a second light pipe 54 which is constructed in a manner similar to the light pipe 46. The second light pipe provides an optically communicating channel from an input 56 (see FIG. 3a) at the arcuate segment 48 to the photocell 52.

At the responsive receptor output leads 58 (see FIG. 3a), there is produced an output signal which moves between a first and second condition indicating the presence (see FIG. 3a) or the absence (see FIG. 3b) of a reflected optical signal 60 at the responsive receptor's input 56.

In summary to this point, under a normal, quiescent, no-flow condition, the incident optical signal 41 generated by the LED 42 passes through light pipe 46 through the flowing medium and impinges upon the reflective surface 24. In this no-flow condition, the reflective surface is positioned opposite the pair of light pipes 46 and 54. Under this circumstance, (see FIG. 3a) the reflected signal 60 is directed by the surface 24 back through the flowing medium towards the input 56 of the light pipe 54 which directs it towards the photocell 52. Consequently, if the LED is energized with pulses of current, then pulses of an incident optical signal 41 are emitted. These in turn are reflected back by the reflective surface 24, producing a pulsing reflected optical signal which is directed through the light pipe 54 to the photocell 52 resulting in pulses of current through the photocell (assuming the LED and photocell are electrically energized as will be discussed).

When water flows in the riser pipe 18 the force resulting from the hydraulic pressure exerted against the paddle member 32 causes it to rotate about the pivot pin 28. Since the reflective surface is integral with the annular circumferential portion 22, i.e. forms a part of the perimeter surface, it is caused to move to a second or flow position under steady flow conditions. This is depicted in FIG. 3b. This interrupts the transmission of the optical signal generated by the LED to the photocell 52. As a result there is an interruption in the pulses of current through the energized photocell 52. Thus the interruption of the current pulses, present in the quiescent condition, in effect becomes an indicator signal related to the flow of water in the riser pipe 18.

Figure 2:
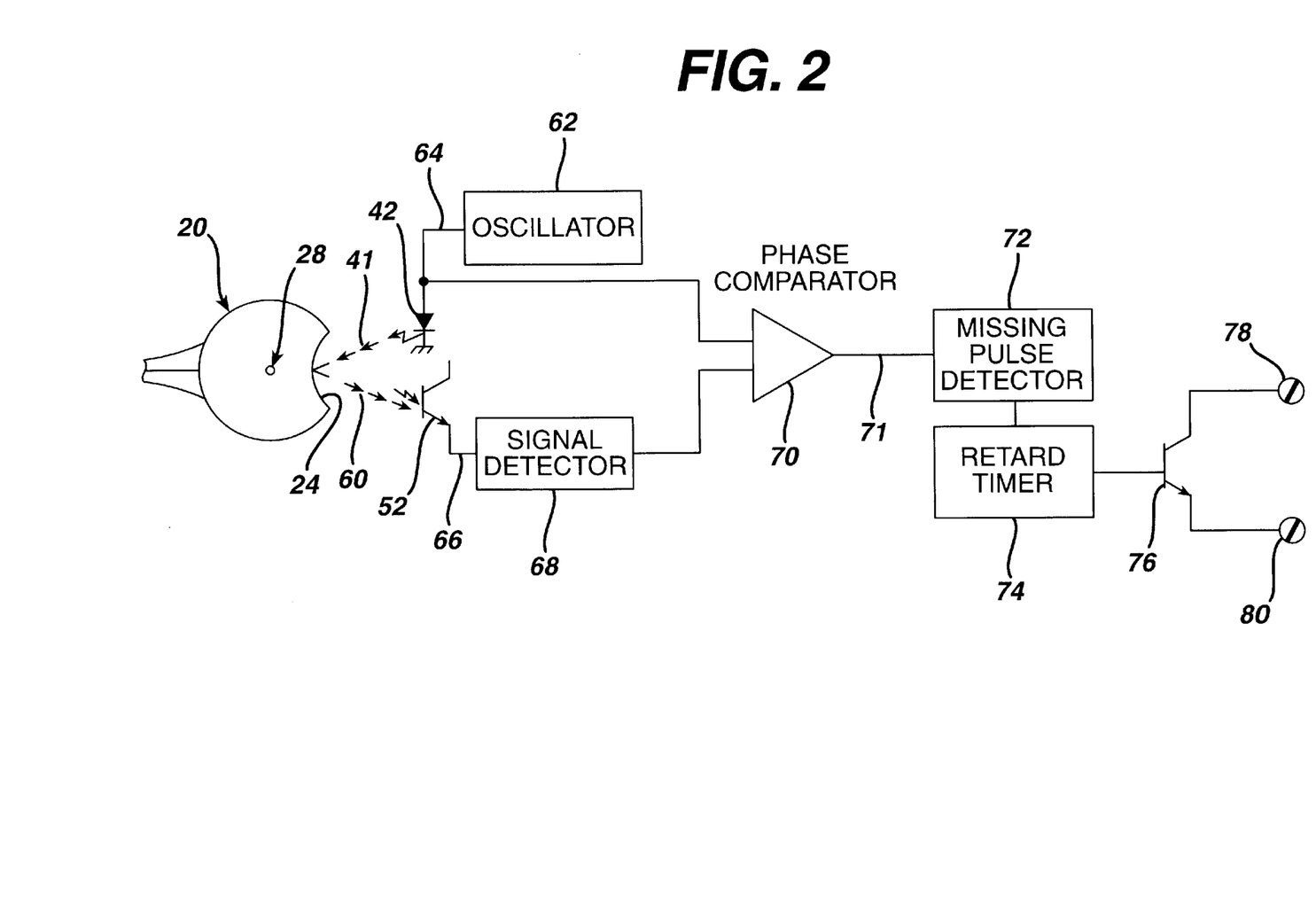
FIG. 2 is a schematic view indicating the processing of a signal as reflected from the sensing element of the embodiment of FIG. 1.

In order for the flow detector of the preferred embodiment to operate, the optical illuminator 40 and the optically responsive receptor 50 must be suitably energized. The circuit architecture for energizing the preferred embodiment is depicted in FIG. 2. Use of identical reference numerals to those employed in FIG. 1 indicate identity of elements. Also although not expressly illustrated, the various functional blocks are electrically powered in a manner familiar to those of ordinary skill in the circuit design art. So too the functional blocks themselves unless otherwise elaborated upon should be familiar as to the intricacies of design to those of ordinary skill in the circuit design art.

An oscillator 62 provides an oscillator output signal on output line 64, to the anode of LED 42. Its cathode is returned to system ground. The oscillator 62 provides short current pulses to the LED 42 which produce the incident optical signal at the LED's optical output face. The preferred embodiment employs an oscillator with a pulse period of 5.0 seconds and a pulse width of 5 milliseconds for a 0.1% duty cycle. These values are only typical of the order of magnitude. The selection of the pulse-width and duty cycle for the subject invention are determined by both internal and external considerations. The internal considerations relate to details of the internal circuit such as the capacitance being used for signal coupling, the parasitic capacitances of semiconductor devices, the selected power dissipation of the LED, the coupling coefficient of the optical path between the LED and the photocell, etc.

The external considerations relate to the average current drawn by the device. By reducing the pulse-width and decreasing the duty cycle the device draws less average current. However, as the duty cycle of the device is decreased the speed of response to a change in conditions is reduced. Again, in the prototyping phase of reducing the invention to a product the trade-offs in duty-cycle, pulse-width versus speed of response, average current, noise immunity are all evaluated to determine the best set of values for the product. The invention is not reliant upon any particular duty cycle or pulse-width or ratio between them.

The values mentioned herein are advanced as being what one would normally use as a starting point in the reduction of the invention to a product. Furthermore, different values for pulse-width and duty cycle will result when integrating this invention with different analog/addressable detection circuit protocols.

The incident optical signal tracks the current pulses to the LED as to phase, pulse width, period, etc. As noted above, as illustrated, if a quiescent or no-flow condition exists, the pulsing reflected optical signal is directed towards the photocell 52. Here the received signal is converted into pulses of electrical current which track the phase, pulse width and pulse period, etc., of the incident optical signal. In the embodiment of FIG. 2, the output of the photocell 52 is supplied to input 66 of signal detector 68. Signal detectors can be made from any commercially available operational amplifier such as the LM 124 available from National Semiconductor, Inc. of Santa Clara, Calif. In many cases they can be constructed from Schmidt trigger CMOS buffers. The signal detector produces an output signal only when the input signal at 66 exceeds a threshold value established by an appropriate selection of resistor values to minimize spurious noise alarms.

The output from the signal detector 68 is conveyed to a phase comparator 70. The phase comparator 70 produces a phase comparator output signal at output 71 only when the signal from the signal detector 68 is in phase with the output of the oscillator 62. This further reduces the potential for spurious alarm signals.

A timing circuit is provided which is adapted to respond to the receptor output signal to produce a change in the indicator signal only after a preset period of time. This avoids indicating fluid flow due to changes in pipe pressure or circumstances other than intended. In the preferred embodiment the timing circuit includes a missing pulse detector (MPD) 72 which receives the output signal from the phase comparator 70.

The MPD 72 can be constructed for example from any commercially available operational amplifier such as the LM 124 or from Schmidt Trigger CMOS buffers. The MPD 72 produces an output signal whenever a pulse from the phase comparator does NOT occur. The loss of a pulse indicates the interruption of the light path between the LED 42 and the photocell 52. The output signal from the MPD 72 is conveyed to electronic circuit 74. The retard timer circuit 74 in a manner familiar to those of ordinary skill in the circuit design art measures the length of time the signal from the MPD 72 has been present (again, indicting the loss of the reflected signal) and compares it to a preset threshold value. When the time threshold is attained the retard timer circuit 74 produces a trigger signal for the output switch 76. The output switch 76 provides a low impedance circuit between the wiring screw terminals 78 and 80 typically connected to a signal voltage source, to thereby produce the indicator signal after the predetermined time delay.

As noted above, when the subject invention is installed on the sprinkler system riser pipe the return spring 38 maintains the paddle 32 perpendicular to the longitudinal axis of the pipe 18. This positions the reflective surface 24 of the circumferential portion 22 opposite the pair of light pipes 46 and 54 in the extension 14. This provides for an optical path between the LED and the photocell, and the photocell receives the reflected optical radiation from the LED. When water begins to flow the paddle swings on its pivot 28. This rotation moves the reflective surface, interrupting the optical path between the LED and the PC. The timing circuitry on the circuit board initiates the retard timing interval. If the paddle returns to normal before the preset retard time has been completed no output signal is produced. However, if the translation of the paddle is sustained the timer completes its time delay and then renders a water flow signal at terminals 78 and 80.

Figure 5A:
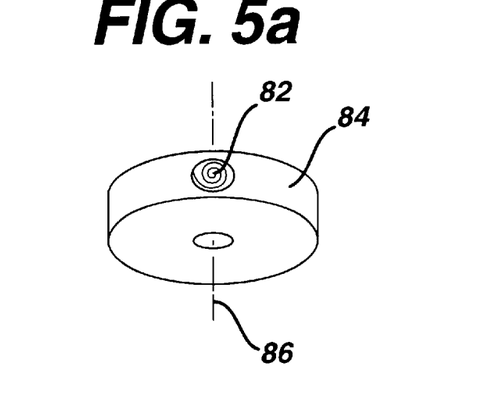
FIG. 5A shows one adaptation of the reflective surface portion of the sensing element.
Figure 5B:
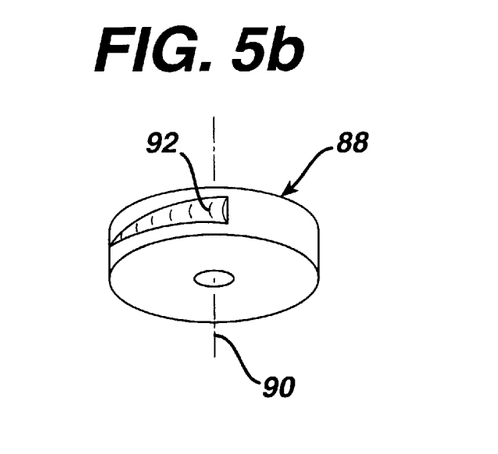
FIG. 5B shows a second adaptation of reflective surface of the sensing element of the preferred embodiment.
Figure 5C:
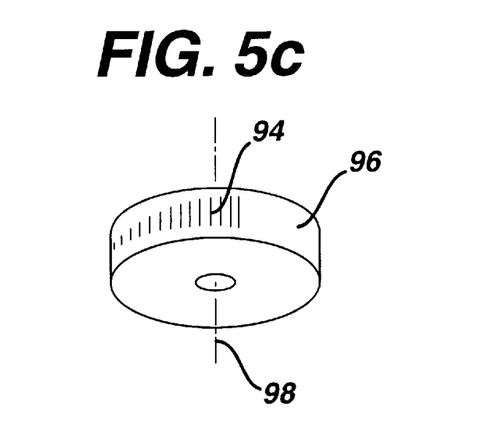
FIG. 5C shows a third adaptation of the reflective surface of the sensing element of the invention.

It will be clear to those skilled in the art that the subject invention can also be used to provide an analog measure of flow. Since the hydraulic pressure against the paddle is a function of paddle area and the return force a function of the Hooke's Law constant of the return spring, a reflective surface of progressively lower reflectance can be used to provide a progressively smaller reflected light signal and hence an analog measure of flow. FIG. 5 shows the various reflective surfaces that can be used in this manner. FIG. 5a shows the binary switch manner of operation which may be employed in the embodiment of FIG. 2. The reflective surface 82 on the circumferential portion 84 provides an "on" versus "off" signal transition when the paddle rotates about the axis 86. In FIG. 5b the circular reflective surface of FIG. 5a has been replaced with one having a shape of a long isosceles triangle. Since reflected radiant power is proportional to the incident intensity times the irradiated area, a larger radiated area produces a larger reflected optical signal. As the sensing element 88 in FIG. 5b rotates about its pivot axis 90 the reflective surface 92 opposite the light pipes becomes smaller in area as the flow rate increases. This will result in a decreasing optical signal rather than the abrupt cessation of it. In FIG. 5c the reflective surface 94 is replaced with a succession of narrow reflective stripes of progressively decreasing length. This embodiment will also result in a reflected optical signal whose characteristics, for example, its signal strength, will vary proportionally to the flow rate as the sensing element 96 rotates about its pivot axis 98 in response to the flow rate.

It would be clear to those skilled in the art that the same analog effect can be achieved by proportionally varying the reflectance of the reflective surface in lieu of the area as in these embodiments.

Figure 6:
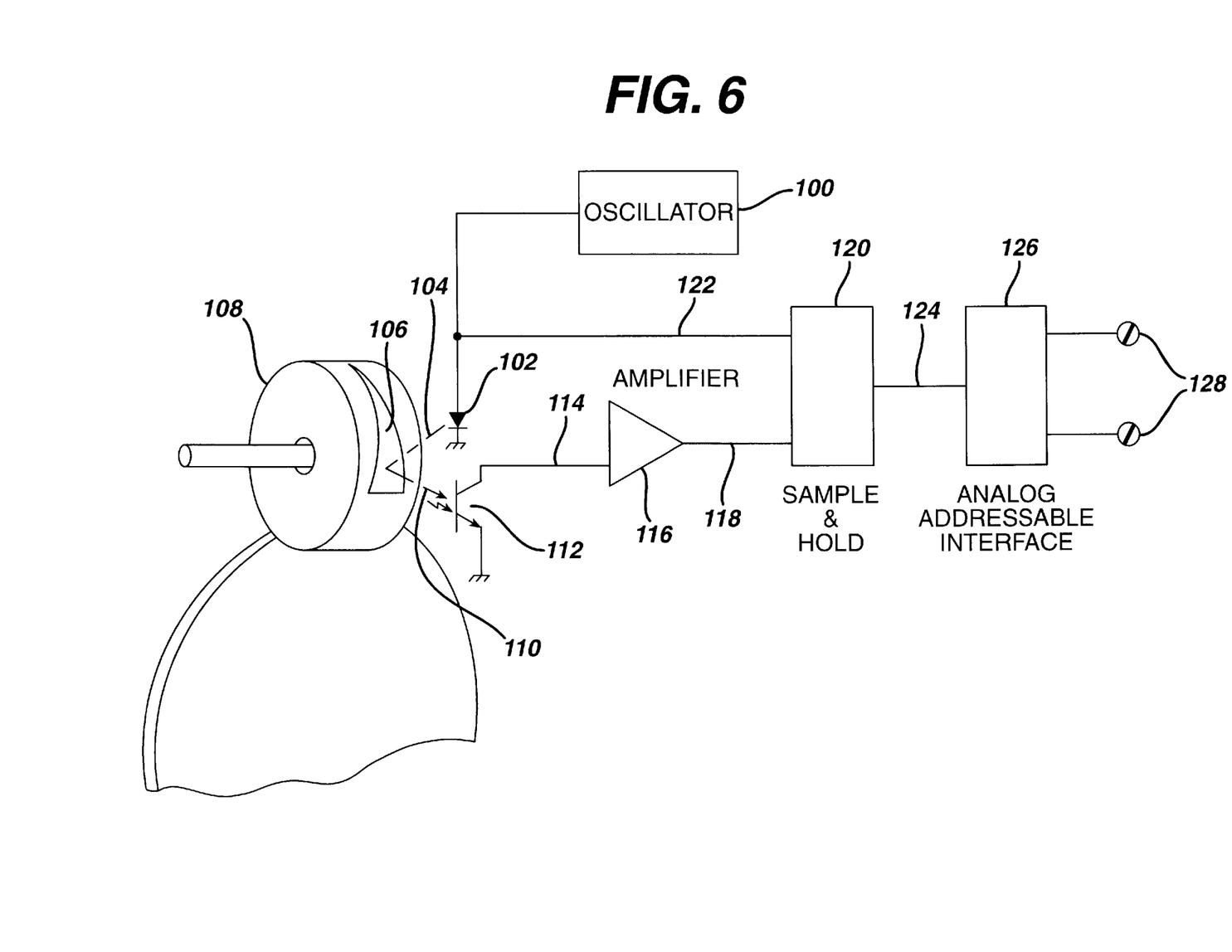
FIG. 6 is a schematic presentation of a system employing the adaptation of the reflective surface depicted in FIG. 5B and including electronic circuitry sufficient to process relevant signal information reflected from the reflective surface.

An electronic circuit for the analog sensor is shown in FIG. 6. An oscillator 100 produces a continuous succession of short current pulses to the light emitting diode (LED) 102. The preferred embodiment employs an oscillator with a pulse period of 5.0 seconds and a pulse width of 5 milliseconds for a 0.1% duty cycle although these values are only typical of the order of magnitude (see discussion above). Pulses of light 104 from LED 102 strike the reflective surface 106 of the sensing element 108. The reflected optical signal 110 is directed to the photocell PC 112. The PC 112 converts the pulses of light 104 into pulses of electrical current. The pulses of electrical current are conveyed from PC 112 to the input 114 of an amplifier 116. Almost any commercially available operational amplifier, such as the LM 124 can be used to amplify the output signal from the photocell 112. The signal from the amplifier is conveyed to one input 118 of a Sample and Hold circuit 120. The output of oscillator 100 is supplied to the second input 122 of the Sample and Hold circuit. Sample and hold circuits are well known to those skilled in the art of electronic circuit design. The Modern Electronics Reference Manual by John Markus, published by McGraw-Hill in 1980 shows 24 different "sample and hold" circuits, implemented with a variety of operational amplifiers, field-effect transistors and FET-input Op amps. Furthermore, some semiconductor firms that manufacture linear integrated circuits produce sample and hold circuits as functional elements. The IC Master Catalog, published by Hearst Business Communications, Inc. lists 115 different integrated circuit, sample and hold circuits. A good general purpose, sample and hold circuit is the LF 198, manufactured by National Semiconductor, Signetics, Linear Technologies and Advanced Micro Devices (AMD). However, the sample and hold function could also be implemented using a FET-Input Op Amp such as the CA3140 made by Harris Semiconductor or the LF 155 made by National Semiconductor, Linear Technologies and others.

The sample and hold circuit 120 provides an input signal to the input 124 of the Analog/Addressable Interface Circuit 126 appropriate for the fire alarm system with which the subject invention is to operate.

By way of background, when fire alarm systems were first developed the "detectors" were electrical switches activated by the increase in temperature of the detector. For example a sealed air chamber would cause a diaphragm to move when the air temperature increased, thus causing a switch to transfer. The "detectors" were wired to a control unit that contained an electro-mechanical relay and a source of power. When the detector switch closed it completed the circuit and allowed current to flow through the relay coil, causing it to transfer and operate some form of occupant notification.

This type of circuit architecture dominated the field for 75 years. "Detectors" remained essentially a sensor that operated a switch. This switch was placed across a pair of wires called the detection circuit and when any one of the detectors operated and "alarm" signal ensued. It was not possible to determine which of the many detectors had operated without visually inspecting each one.

With the advent of modern semiconductor integrated circuits it became possible to put a serial communication IC in each detector and a serial communication port in the control panel and determine, at the control panel, which detector had initiated the alarm. Each detector was given a binary "name" or address. The control panel was programmed with the addresses of all of the detectors and would "pole" the detectors in sequence to determine if the detector was in the alarm state or not. This type of system was called an "addressable" detector fire alarm system or "addressable system" in the fire protection community.

The addressable system still had the short coming that the individual detector still needed to possess all of the decision making circuitry to determine if conditions warranted a fire alarm signal. The solution was to locate the decision making in the control panel and design the individual detector so it responded to the control panel query with an analog current, proportional to the level of smoke or heat present at the time the detector was polled. The control panel polled the individual detector and then measured the current drawn from the detection circuit. The steady state current for the detector power supply was subtracted and the remaining current represented the fire related stimulus the detector was receiving at that time. This architecture is the dominant one in fire alarm systems today and is called the "analog/addressable" circuit. Each of the major manufacturers of fire alarm systems has its own proprietary protocol, consisting of an application specific integrated circuit (ASIC) for the detector and software protocol for the computer in the control unit.

The advantage of the analog/addressable circuit is that it provides the architecture that can accommodate a wide range of building functions. The control unit can be programmed to interpret an analog current from one address to be a smoke level, from the next address a temperature and from the next the humidity or air velocity of whatever else is important in the management of the fire risk at the site. In the subject invention, the use of the analog/addressable circuit permits the transmission of the water flow rate in the sprinkler system riser to the fire alarm control unit. This enables firefighters to determine if the sprinkler demand is increasing, indicating a growing fire that is not being controlled by the sprinkler system, or a stable flow, indicating that the sprinkler system is controlling the fire. The subject invention will work with any of the analog/addressable protocols that are currently on the market. Each manufacturer of fire alarm systems has its own, proprietary interface protocol, implemented with its own proprietary interface integrated circuit. The analog output from the sample and hold circuit 120 is made available to the interface circuit as appropriate for the fire alarm system. The invention is connected to the fire alarm system via wiring screw terminals 128.

While the above describes one circuit those skilled in the art will recognize that there are numerous circuits that can be used to achieve the objective of the invention. Further, while the invention has been described in the context of fire sprinkler systems, it has broad application to many fields where the fact of fluid flow or flow rate is required to be monitored. Thus the scope of application need only be limited by the breadth of the claims that follow.

What is claimed is:

1. A fluid flow detection device for detecting fluid flow in a conduit comprising:
    (a) a fluid movement, sensing element including a portion having a reflective surface integral therewith;
    (b) a mounting element, including a pivot element, for pivotally mounting said sensing element, said sensing element and said mounting element, including said pivot element, disposed within the conduit, whereby said sensing element is permitted to move between a fluid quiescent position and a respective displaced position in response to the flow of fluid in the conduit, said reflective surface moving accordingly, said reflective surface having a respective reflectance at said fluid quiescent position and said respective displaced position;
    (c) an optical illuminator;
    (d) an electrically powered energizer to electrically energize said optical illuminator;
    (e) an incident optical signal produced by said optical illuminator when said energizer energizes said optical illuminator, said optical illuminator directing said incident optical signal through the fluid whose flow is being sensed towards said portion;
    (f) a reflected optical signal directed off from said reflective surface in response to said incident optical signal impinging upon said reflective surface, said reflected optical signal characteristically dependent on the reflectance of the reflective surface at the respective position thereof illumined by said incident optical signal;
    (g) an electrically powered optically responsive receptor including a responsive receptor input and output, said responsive receptor positioned to receive said reflected optical signal after having passed back through the fluid whose flow is being sensed at said receptor input;
    (h) an optically responsive receptor output signal, occurring at said receptor output, said receptor output signal characteristically dependent on said reflected optical signal at said responsive receptor input; and,
    (i) an indicator adapted to respond to said receptor output signal to thereby produce an indicator signal indicative of the movement of said reflective surface, and, accordingly, said sensing element, in response to the flow of fluid in the conduit.

2. The fluid flow detection device claimed in claim 1 wherein said sensing element includes a paddle member, said paddle member disposed in the fluid, said paddle member responsive to the force exerted thereon by the flow of the fluid against said paddle member whereby said sensing element moves.

3. The fluid flow detection device claimed in claim 1 wherein said optical illuminator is a LED.

4. The fluid flow detection device claimed in claim 2 wherein said optical illuminator is a LED.

5. The fluid flow detection device claimed in claim 1 wherein said energizer includes an oscillator having an oscillator output signal having a predetermined phase, pulse width and pulse period, said oscillator output signal electrically provided to said illuminator whereby said incident optical signal tracks said oscillator output signal at least as to said phase, pulse width and said pulse period.

6. The fluid flow detection device claimed in claim 3 wherein said energizer includes an oscillator having an oscillator output signal having a predetermined phase, pulse width and pulse period, said oscillator output signal electrically provided to said LED whereby said incident optical signal tracks said oscillator output signal at least as to said phase, pulse width and said pulse period.

7. The fluid flow detection device claimed in claim 4 wherein said energizer includes an oscillator having an oscillator output signal having a predetermined phase, pulse width and pulse period, said oscillator output signal electrically provided to said LED whereby said incident optical signal tracks said oscillator output signal at least as to said phase, pulse width and said pulse period.

8. The fluid flow detection device claimed in claim 1 wherein said optically responsive receptor is a photocell.

9. The fluid flow detection device claimed in claim 6 wherein said optically responsive receptor is a photocell.

10. The fluid flow detection device claimed in claim 7 wherein said optically responsive receptor is a photocell.

11. The fluid flow detection device claimed in claim 5 further comprising a phase comparator having a phase comparator output signal said phase comparator responsive to said oscillator output signal and said responsive receptor output signal to thereby produce said phase comparator output signal but only when said responsive receptor output signal is in phase with said oscillator output signal, said indicator further adapted to produce an indicator signal only if, at least, said phase comparator output signal is produced.

12. The fluid flow detection device claimed in claim 9 further comprising a phase comparator having a phase comparator output signal said phase comparator responsive to said oscillator output signal and said responsive receptor output signal to thereby produce said phase comparator output signal but only when said responsive receptor output signal is in phase with said oscillator output signal, said indicator further adapted to produce an indicator signal only if, at least, said phase comparator output signal is produced.

13. The fluid flow detection device claimed in claim 10 further comprising a phase comparator having a phase comparator output signal said phase comparator responsive to said oscillator output signal and said responsive receptor output signal to thereby produce said phase comparator output signal but only when said responsive receptor output signal is in phase with said oscillator output signal, said indicator further adapted to produce an indicator signal only if, at least, said phase comparator output signal is produced.

14. The fluid flow detection device claimed in claim 1 wherein said receptor output signal includes a first and second condition, said first and second condition of said receptor output signal characterizing, respectively, the presence or absence of said reflected optical signal at said responsive receptor input and wherein said indicator further includes a timing circuit, said timing circuit adapted to respond to said receptor output signal to thereby produce a change in said indicator signal indicative of a change in said receptor output signal from said first condition to said second condition after a predetermined minimum period of time after said change from said first condition to said second condition occurs.

15. The fluid flow detection device claimed in claim 11 wherein said receptor output signal includes a first and second condition, said first and second condition of said receptor output signal characterizing, respectively, the presence or absence of said reflected optical signal at said responsive receptor input and wherein said indicator further includes a timing circuit, said timing circuit adapted to respond to said receptor output signal to thereby produce a change in said indicator signal indicative of a change in said receptor output signal from said first condition to said second condition after a predetermined minimum period of time after said change from said first condition to said second condition occurs.

16. The fluid flow detection device claimed in claim 13 wherein said receptor output signal includes a first and second condition, said first and second condition of said receptor output signal characterizing, respectively, the presence or absence of said reflected optical signal at said responsive receptor input and wherein said indicator further includes a timing circuit, said timing circuit adapted to respond to said receptor output signal to thereby produce a change in said indicator signal indicative of a change in said receptor output signal from said first condition to said second condition after a predetermined minimum period of time after said change from said first condition to said second condition occurs.

17. The fluid flow detection device claimed in claim 12 wherein wherein said receptor output signal includes a first and second condition, said first and second condition of said receptor output signal characterizing, respectively, the presence or absence of said reflected optical signal at said responsive receptor input and said indicator further includes a timing circuit, said timing circuit adapted to respond to said receptor output signal to thereby produce a change in said indicator signal indicative of a change in said receptor output signal from said first condition to said second condition after a predetermined minimum period of time after said change from said first condition to said second condition occurs.

18. The fluid flow detection device claimed in claim 1 wherein the area of the reflective surface is altered proportionately between said fluid quiescent position and a respective displaced position such that the reflected optical signal is characteristically varied between said quiescent position and said respective displaced position such that the indicator signal is a measure of the rate of flow of the fluid in the conduit.

19. The fluid flow detection device claimed in claim 8 wherein the area of the reflective surface is altered proportionately between said fluid quiescent position and a respective displaced position such that the reflected optical signal is characteristically varied between said quiescent position and said respective displaced position such that the indicator signal is a measure of the rate of flow of the fluid in the conduit.

20. The fluid flow detection device claimed in claim 9 wherein the area of the reflective surface is altered proportionately between said fluid quiescent position and a respective displaced position such that the reflected optical signal is characteristically varied between said quiescent position and said respective displaced position such that the indicator signal is a measure of the rate of flow of the fluid in the conduit.

21. The fluid flow detection device claimed in claim 10 wherein the area of the reflective surface is altered proportionately between said fluid quiescent position and a respective displaced position such that the reflected optical signal is characteristically varied between said quiescent position and said respective displaced position such that the indicator signal is a measure of the rate of flow of the fluid in the conduit.

22. The fluid flow detection device claimed in claim 1 wherein the reflectance of the reflective surface is altered proportionately between said fluid quiescent position and a respective displaced position such that the reflected optical signal is characteristically varied between said quiescent position and said respective displaced position such that the indicator signal is a measure of the rate of flow of the fluid in the conduit.

23. The fluid flow detection device claimed in claim 8 wherein the reflectance of the reflective surface is altered proportionately between said fluid quiescent position and a respective displaced position such that the reflected optical signal is characteristically varied between said quiescent position and said respective displaced position such that the indicator signal is a measure of the rate of flow of the fluid in the conduit.

24. The fluid flow detection device claimed in claim 9 wherein the reflectance of the reflective surface is altered proportionately between said fluid quiescent position and a respective displaced position such that the reflected optical signal is characteristically varied between said quiescent position and said respective displaced position such that the indicator signal is a measure of the rate of flow of the fluid in the conduit.

25. The fluid flow detection device claimed in claim 10 wherein the reflectance of the reflective surface is altered proportionately between said fluid quiescent position and a respective displaced position such that the reflected optical signal is characteristically varied between said quiescent position and said respective displaced position such that the indicator signal is a measure of the rate of flow of the fluid in the conduit.

26. The fluid flow detection device claimed in claim 1 further including a sample and hold circuit wherein said indicator signal is stored for a predetermined period of time to allow for a query of said indicator signal at the end of said predetermined period of time.

27. The fluid flow detection device claimed in claim 8 further including a sample and hold circuit wherein said indicator signal is stored for a predetermined period of time to allow for a query of said indicator signal at the end of said predetermined period of time.

28. The fluid flow detection device claimed in claim 9 further including a sample and hold circuit wherein said indicator signal is stored for a predetermined period of time to allow for a query of said indicator signal at the end of said predetermined period of time.

29. The fluid flow detection device claimed in claim 10 further including a sample and hold circuit wherein said indicator signal is stored for a predetermined period of time to allow for a query of said indicator signal at the end of said predetermined period of time.

30. The fluid flow detection device claimed in claim 18 further including a sample and hold circuit wherein said indicator signal is stored for a predetermined period of time to allow for a query of said indicator signal at the end of said predetermined period of time.

31. The fluid flow detection device claimed in claim 19 further including a sample and hold circuit wherein said indicator signal is stored for a predetermined period of time to allow for a query of said indicator signal at the end of said predetermined period of time.

32. The fluid flow detection device claimed in claim 20 further including a sample and hold circuit wherein said indicator signal is stored for a predetermined period of time to allow for a query of said indicator signal at the end of said predetermined period of time.

33. The fluid flow detection device claimed in claim 21 further including a sample and hold circuit wherein said indicator signal is stored for a predetermined period of time to allow for a query of said indicator signal at the end of said predetermined period of time.

34. The fluid flow detection device claimed in claim 22 further including a sample and hold circuit wherein said indicator signal is stored for a predetermined period of time to allow for a query of said indicator signal at the end of said predetermined period of time.

35. The fluid flow detection device claimed in claim 23 further including a sample and hold circuit wherein said indicator signal is stored for a predetermined period of time to allow for a query of said indicator signal at the end of said predetermined period of time.

36. The fluid flow detection device claimed in claim 24 further including a sample and hold circuit wherein said indicator signal is stored for a predetermined period of time to allow for a query of said indicator signal at the end of said predetermined period of time.

37. The fluid flow detection device claimed in claim 25 further including a sample and hold circuit wherein said indicator signal is stored for a predetermined period of time to allow for a query of said indicator signal at the end of said predetermined period of time.

* * * * *